(12) United States Patent
Epstein et al.

(10) Patent No.: US 7,520,801 B2
(45) Date of Patent: Apr. 21, 2009

(54) VARIABLE GEOMETRY END-FITTING FOR MEAT STUFFER

(75) Inventors: Moshe Epstein, Northbrook, IL (US); Peter Parthenis, 1726 Clover Dr., Inverness, IL (US) 60067

(73) Assignee: Peter Parthenis, Iverness, IL (US)

( * ) Notice: Subject to any disclaimer, the term of this patent is extended or adjusted under 35 U.S.C. 154(b) by 804 days.

(21) Appl. No.: 11/135,950

(22) Filed: May 24, 2005

(65) Prior Publication Data

US 2006/0280850 A1    Dec. 14, 2006

(51) Int. Cl.
*A22C 11/00* (2006.01)

(52) U.S. Cl. ....................................................... 452/30

(58) Field of Classification Search ............. 452/21–26, 452/30–35, 38–41, 46, 51; 99/494, 353; 426/413, 410, 105; 53/122, 175, 436, 439, 53/452, 457, 527, 574–577; 425/89, 117, 425/129.1

See application file for complete search history.

(56) References Cited

U.S. PATENT DOCUMENTS

| | | | | |
|---|---|---|---|---|
| 3,404,430 | A | * | 10/1968 | Kielsmeier et al. ............ 452/35 |
| 3,949,446 | A | | 4/1976 | Smith |
| 4,028,775 | A | * | 6/1977 | Tysver ......................... 452/39 |
| 4,110,871 | A | | 9/1978 | Greenham et al. |
| 4,142,273 | A | | 3/1979 | Gay |
| 4,442,568 | A | * | 4/1984 | Petry ........................... 452/38 |
| 4,535,508 | A | * | 8/1985 | Aceto ........................... 452/38 |
| 4,648,153 | A | * | 3/1987 | Coroneos ................. 425/382 R |
| 4,744,130 | A | * | 5/1988 | Epstein et al. ................. 425/89 |
| 4,817,244 | A | | 4/1989 | Townsend |
| 4,893,377 | A | | 1/1990 | Evans et al. |
| 4,940,597 | A | | 7/1990 | Townsend |
| 4,949,429 | A | | 8/1990 | Stanley |
| 4,958,411 | A | * | 9/1990 | Stanley ......................... 452/37 |
| 5,352,151 | A | | 10/1994 | Piereder |
| 5,813,906 | A | | 9/1998 | Phillips |

FOREIGN PATENT DOCUMENTS

| | | |
|---|---|---|
| EP | 0 217 612 | 4/1987 |
| EP | 0 452 528 | 10/1991 |
| GB | 2 251 365 | 7/1992 |

OTHER PUBLICATIONS

European Search Report for EP App. No. 06252670.2 dated Aug. 29, 2006.

* cited by examiner

*Primary Examiner*—Thomas Price
(74) *Attorney, Agent, or Firm*—McDermott Will & Emery LLP

(57) ABSTRACT

A device for manufacturing a frusto-conical shaped meat product using mold casing that receives ground meat under pressure. The mold casing has an inner wall, a first lateral end, and a second lateral end. The mold casing has a frusto-conical shape, for forming the meat product into a desired shape and cross section. An end fitting is secured to the discharge end of a meat stuffer. The end fitting includes a plurality of pivotable, flexible, adjacent, partially overlapping fins. The fins pivot as they are moved relative to the mold casing, and in that way maintain contact with the inner wall of the mold casing.

9 Claims, 4 Drawing Sheets

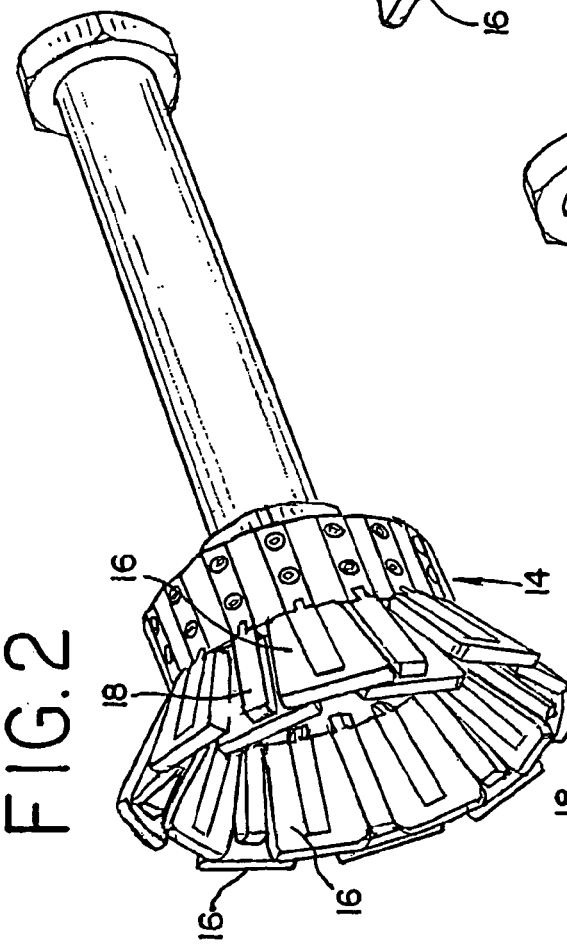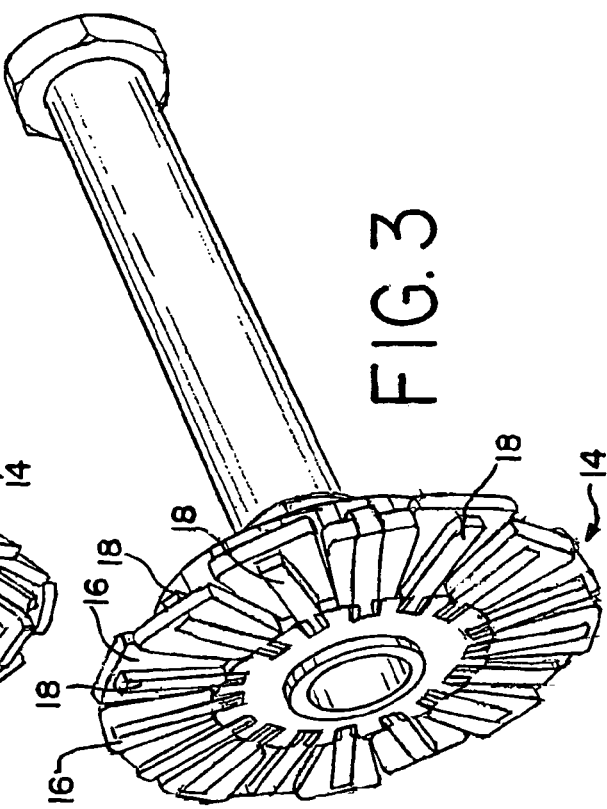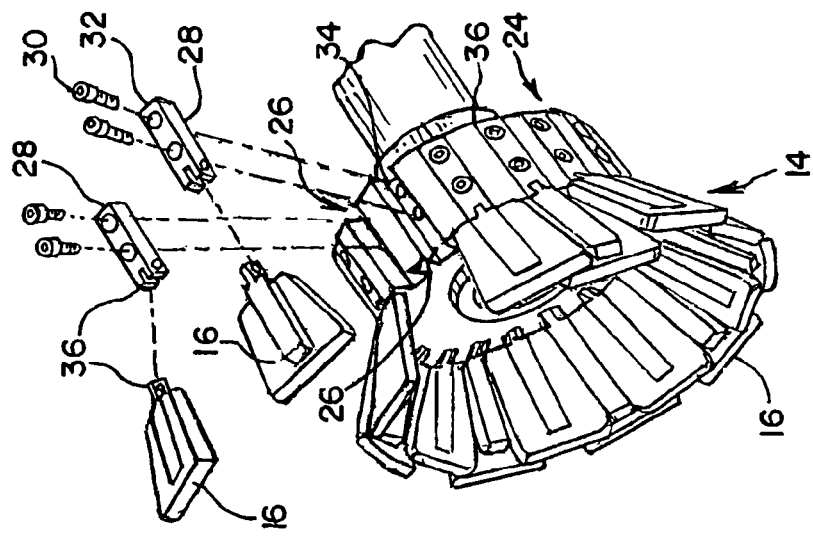

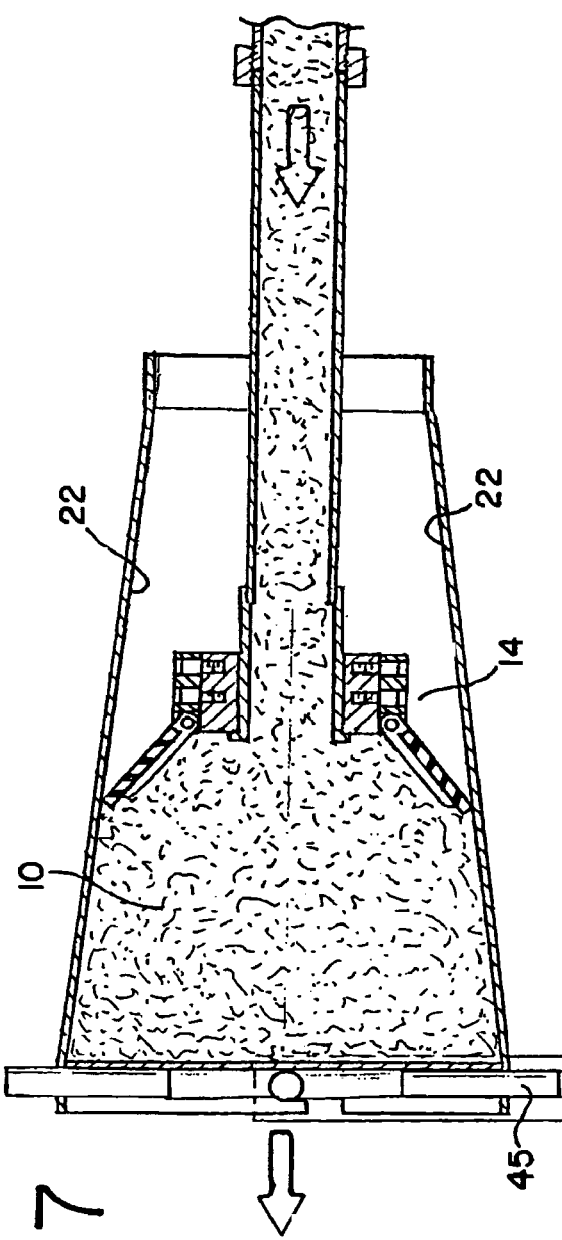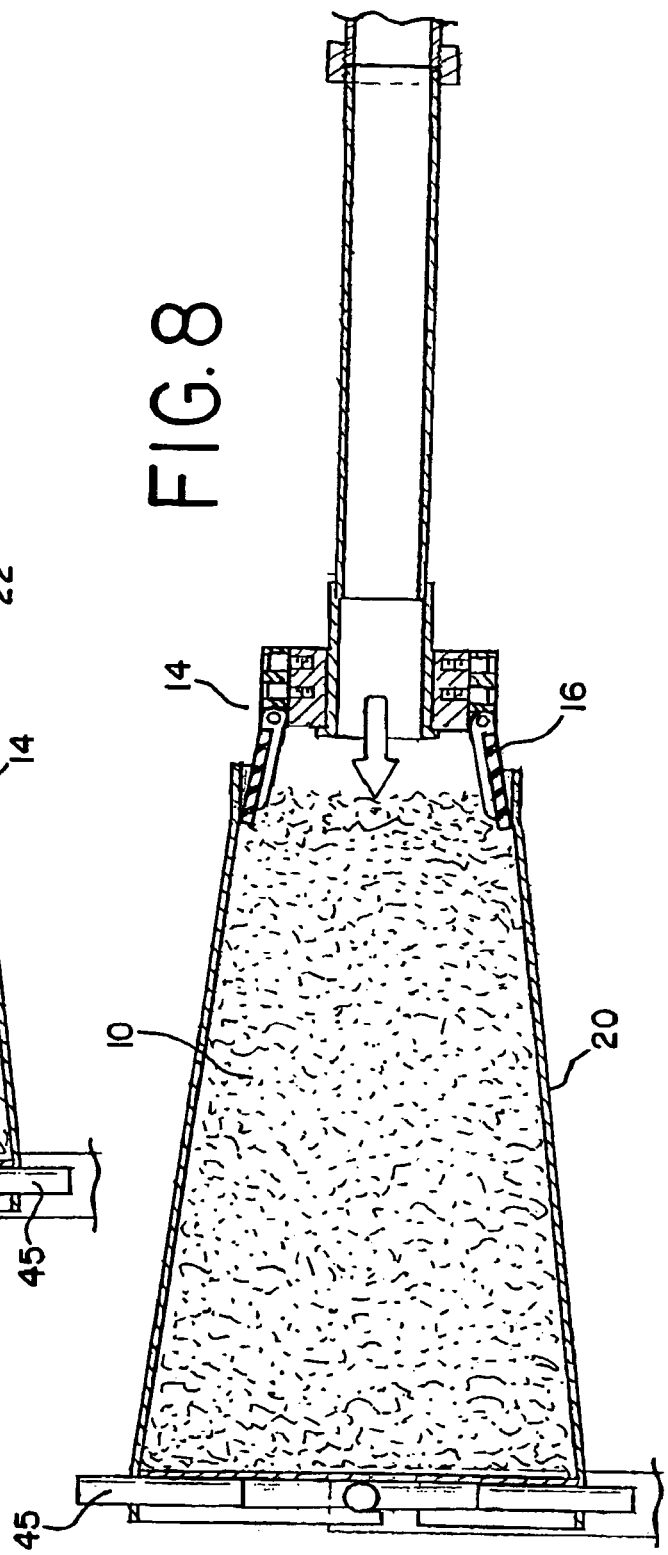

VARIABLE GEOMETRY END-FITTING FOR MEAT STUFFER

TECHNICAL FIELD

The invention relates to a variable geometry end fitting for a meat stuffer. The end fitting facilitates the forming of ground muscle meats into a product having a predetermined shape.

BACKGROUND OF THE INVENTION

Stuffers for ground meats are well-known in the art. Typically, these stuffers are used with conventional sausage making machines to fill natural or artificial sausage casings with ground or emulsified meats. Stuffers of the prior art, and their use with sausage making machines, are described in various United States patents, including U.S. Pat. Nos. 5,813,906; 5,352,151; 4,958,411; 4,949,429; 4,940,597; 4,893,377; 4,817,244; 4,142,273; 4,110,871; and 3,949,446. A prior art device for packing and forming ground meats is described in U.S. Pat. No. 4,648,153.

These stuffers and sausage making machines are also used for making the specialty meat commonly known as gyros. Gyros is typically made from one or more ground meats, including but not limited to beef, lamb, pork, and chicken. The meats used in gyros are ground to a well-known, preferred size and texture, and then moved from the sausage making machine, into the stuffer, and then to a mold.

Unlike sausages, which are comprised of ground meat inserted into a natural or artificial casing, gyros is typically made by placing the ground meat under pressure through the stuffer, and into a separate, cylindrical container. This cylindrical container is typically made of stainless steel. After the meat has been inserted under pressure into the cylindrical container, the meat takes on the cylindrical shape of that container. The cylinder may then be removed. This leaves a free-standing, bulk piece of meat in the form of a cylinder.

Protein has a muscle memory which effectively causes the ground meat to bind together, even after the first grinding. This protein memory causes the meat to stick together, much like a whole, unground piece of meat.

The manufactured gyros cylinders are typically between twenty and forty-five pounds in weight, prior to trimming. The gyros meat in this self-supporting, cylindrical form could be heated, cooked, cut from the cylinder, and then served to the consumer.

However, for historical reasons, and because of consumer and retailer preferences, this free-standing gyros meat cylinder is trimmed, until it attains the shape of a cone. It is this trimmed cone which is sent to the retailer for cooking and serving.

Significant problems result from the trimming of these gyros cylinders, to form cones. First, the shaping of this cylinder requires a separate trimming station and saw, increasing labor costs.

At this trimming station, the gyros cylinder is held at an angle, and then rotated. As the gyros cylinder is rotated, the band saw adjacent the cylinder cuts a ribbon of meat from the cylinder.

This ribbon of meat is collected, and then recycled to the sausage making machine. In the sausage making machine, the recycled meat is combined with fresh, unground meat, and then ground together.

When the recycled meat is ground a second time, it does not bind as well with the previously unground meat. Due to the loss of these binding characteristics, this combination of reground meat, and previously unground meat, cannot be used to make large gyro cones. Instead, this combination can only be used to make substantially smaller gyro cones.

Moreover, each time the meat is recycled, the texture or feel of that meat is softer, and increasingly less pleasing to the consumer's palate.

The binding characteristics and the texture or feel of the meat become progressively worse, each time the previously recycled meat is cut from the cylinder, and then recycled for a second, third, or fourth time.

As noted above, history and retailer and customer preferences have dictated a cone shape for formed, bulk gyros meat. However, gyros meat manufacturers have, until now, been unable to initially form bulk gyros meat in the desired cone shape. Thus, the gyros meat is invariably formed in a cylindrical shape, and then trimmed to create a cone. As a result, until now, the manufacturing inefficiencies and quality problems described above have persisted.

The problems in attempting to form gyros meat in cone shapes can best be appreciated by an understanding of the methods of making gyros meat in cylindrical shapes. To make cylindrically-shaped bulk gyros, ground meat from the sausage making machine is transferred to the stuffer. A rigid, round, polymeric disc is secured to the end of the stuffer.

As indicated above, the shaped bulk gyros is typically made by placing the ground meat under pressure into the cylindrical stainless steel container. The cylindrical container is mounted upon a carriage. During manufacture of the gyros, the carriage moves the cylindrical container towards and away from the stationary stuffer, and along an axis that is generally common to the axis of the stuffer.

In order to fill the cylindrical container with the ground gyros meat, the cylindrical container is moved by the carriage to a position close to the discharge end of the stuffer.

Upon movement of the cylindrical container to a position near the discharge end of the stuffer, that container is positioned for filling with the ground gyros meat. The polymeric disc is of substantially the same diameter as the cylindrical container; as a result, a seal is formed between the inner wall of the cylindrical container and the polymeric disc.

As the ground gyros meat is dispensed from the discharge end of the stuffer, the meat begins to fill the cylindrical container. As a result, that container is moved along the carriage, in an axial direction away from the stationary stuffer. The stuffer/cylindrical container/polymeric disc combination ensures that the gyros meat is dispensed into the cylindrical container at a constant pressure, and ensures that the resulting cylinder will be free-standing and self-supporting.

In contrast, in order to create bulk gyros in a pre-formed cone shape, it would be necessary to use a cone-shaped, stainless steel container, rather than a cylindrical, stainless steel container. The overriding difficulty in prior attempts to create such pre-formed cone shapes has been the inability to provide, in such cone-shaped containers, a substitute for the circular polymer disc that retains a seal when creating bulk cylindrically-shaped gyros.

The co-inventors of the present invention attempted to solve this problem through the use of a flexible, resilient hollow piston. This device and method was described in U.S. Pat. No. 4,744,130. This device and method proved, however, to be commercially inadequate. The industry did not adapt this method, but instead continued to make cylindrical gyros meat products, and then trim them to a cone shape, as described above.

Accordingly, it is an object of this invention to provide a device that is capable of creating bulk gyros that is initially formed in the shape of a cone. It is also an object of this invention to create a method which permits the formation of bulk gyros in a pre-formed cone shape. It is also an object of the invention to create a stuffer that includes an end fitting having a variable geometry. In this way, as a mold casing is moved along that end fitting, the effective diameter of the end fitting increases or decreases. As a result, portions of that end fitting remain in contact with the inner wall of the cone-shaped container. It is a further object of this invention to eliminate or virtually eliminate the recycling of gyros meat that results from the trimming of excess meat from the cylindrically-shaped, bulk gyros pieces that are currently being made.

The present invention is provided to solve the problems discussed above and other problems, and to provide advantages and aspects not provided by prior art apparatus and methods of this type.

SUMMARY OF THE INVENTION

The invention is a process of making a free-standing, initially cone-shaped meat product from a ground meat raw material. This process uses a conventional meat stuffer. That meat stuffer is provided with a novel end fitting.

Fin-like elements secured to the new end fitting enable that fitting to attain varying geometries or effective diameters. The effective diameter of this end fitting changes as it moves within and relative to a cone-shaped container or mold casing. Particularly, as the mold casing is moved along that end fitting, fins that are secured to the end fitting pivot towards or away from that end fitting, and towards or away from the inner walls of that container.

As a result of this pivoting action, these fins cause the end fitting to assume varying diameters. The effective diameter of the end fitting varies substantially in proportion to the inner diameter of the mold casing. Particularly, for example, as the mold casing is moved along the stationary end fitting, i.e., from the wide end of the mold casing to the narrower end of the mold casing, the effective diameter of the end fitting decreases.

Conversely, as the mold casing is moved in the opposite direction, the effective diameter of the fitting increases.

Initially, i.e., prior to filling, the mold casing is positioned such that its wider end is positioned adjacent the end fitting. As the fins contact a removable end flange at the wider end of the cone-shaped container, those fins expand. As a result of this expansion, the fins may contact the inner walls of the mold casing.

The meat now begins to be discharged from the stuffer, and into the mold casing. As the mold casing is gradually filled with meat, the pressure created by the meat gradually forces the mold casing away from the end fitting and the meat stuffer. The mold casing's movement away from the stationary end fitting and meat stuffer continues, until the mold casing is completely filled with ground meat.

In the embodiment shown in the present specification, the mold casing moves, and the end fitting is stationary. However, it will be understood that the scope of the invention includes an embodiment wherein the end fitting moves, and the mold casing is stationary. In fact, all that is important is that the mold casing and the end fitting are movable relative to each other.

Preferably, a plurality of overlapping fins are secured to the end fitting.

These fins pivot as they are moved relative to the mold casing. As a result of this pivoting action, these fins maintain substantial contact with the inner wall of the mold casing.

In this embodiment, the mold casing is laterally movable along a first axis. This first axis is generally coaxial with a second axis through the center of the stuffer. Again, it will be understood that the invention covers embodiments where the mold casing and the end fitting are movable relative to each other, regardless of whether the mold casing or the end fitting is stationary.

Each fin at least partially overlaps the adjacent fin.

The fins slide along and sealingly engage the inner walls of the mold casing. In this way, the fins conform to the changing cross-sections and diameters of that inner wall.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 2 is an enlarged, perspective view of the end fitting shown in FIG. 1, with the fins pivoted and configured so as to form an end fitting having a relatively small diameter;

FIG. 3 is a view of the end fitting of FIG. 2, but with the fins pivoted and configured so as to form an end fitting having a relatively large diameter;

FIG. 4 is a partially exploded, perspective view of the end fitting of FIGS. 2 and 3;

FIG. 7 is a partial sectional view of an intermediate portion of the mold casing positioned adjacent the end fitting, with the mold casing partially filled with meat;

FIG. 8 is a partial sectional view of the narrowest portion of the mold casing positioned adjacent the end fitting, with the mold casing completely filled with meat.

DETAILED DESCRIPTION

This invention is susceptible of embodiments in many different forms. However, the drawings and the specification describe in detail one or more preferred embodiments of the invention. It will be understood by those of skill in the art that the present disclosure is to be considered as disclosing but one example of the principles of the invention. It will also be understood by those of skill in the art that the present disclosure is not intended to limit the broad aspect of the invention to the illustrated embodiment.

Many of the operations and machines used in connection with the processes described in this specification are substantially similar to those well-known in the art. Many of those operations and machines are also described in U.S. Pat. No. 4,744,130 ("the '130 patent"). The subject matter of the '130 patent was also invented by the inventors of the device and apparatus described in the present specification. Accordingly, the disclosures of U.S. Pat. No. 4,744,130 are incorporated herein by reference.

Figure 1:
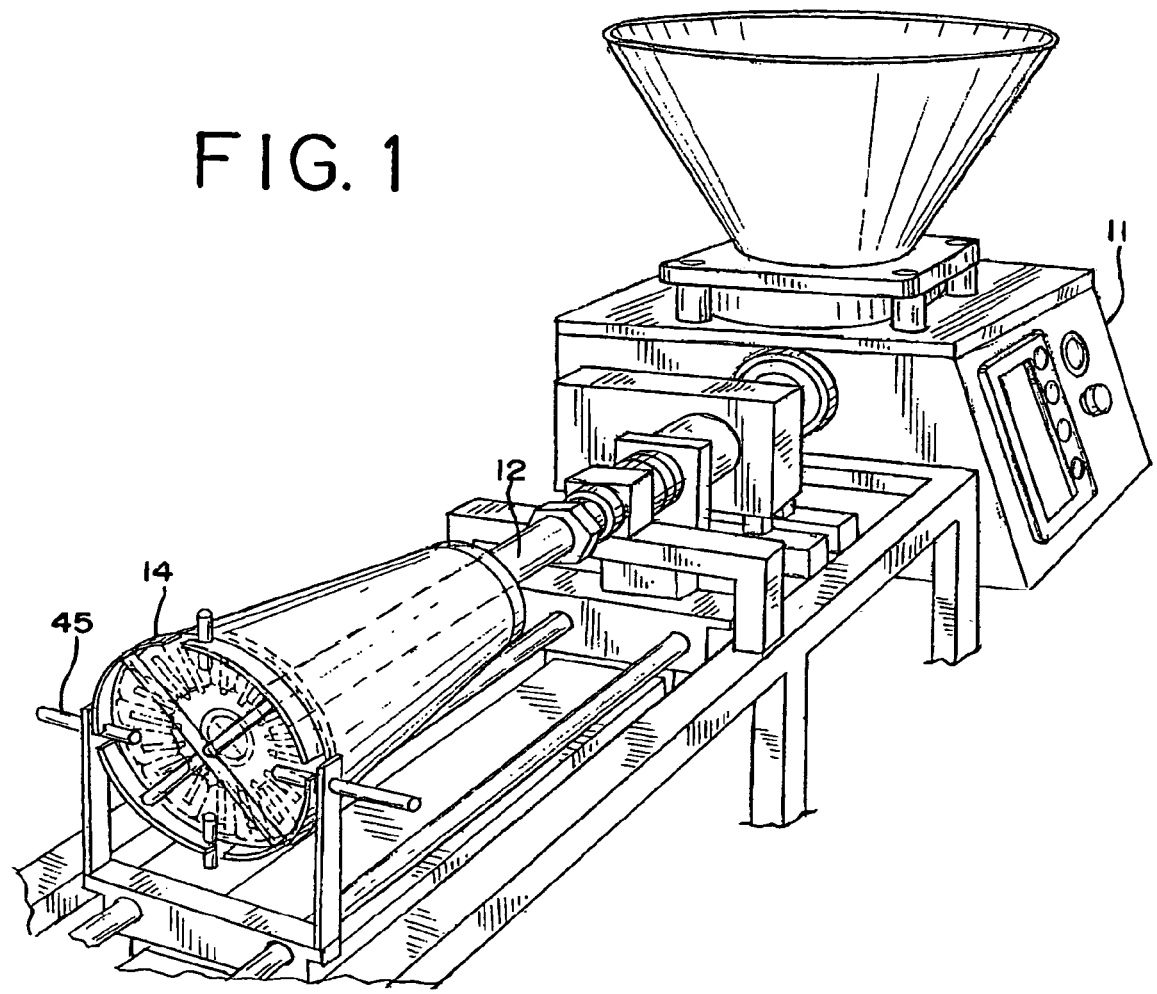
FIG. 1 is a perspective view of an end fitting in accordance with the invention, threadably secured at the end of a conventional meat stuffer, and positioned near the bottom of a mold casing.

As may be seen in FIGS. 1 and 7-8, the manufacture of initially cone-shaped, bulk gyros through the use of the process and apparatus of the invention begins with the grinding of the meat 10 used to make the gyros cone. The ground meat 10 is taken from the meat grinding and preparing machine 11 shown in FIG. 1, and then passed from this machine 11 through a so-called meat stuffer 12. This meat stuffer 12 is an elongated tube. Like the meat grinding and preparing machine 11, the meat stuffer 12 is stationary. Neither the machine 11 nor the meat stuffer 12 move during the operations described in this specification.

As may also be seen in this FIGS. 1-4 and 6-8, a novel end fitting 14 is attached to the end of the stuffer 12. Typically, this end fitting 14 is threadably secured to the stuffer 12.

FIG. 2 is an enlarged, perspective view of the end fitting 14 shown in FIG. 1. Attached to the end fitting 14 are a plurality of at least partially overlapping fins 16.

The fins 16 of this embodiment are preferably of a trapezoidal shape. Each of the fins 16 measures approximately: 2¼" in length; 1⅞" in width (at the top); 1¼" in width (at the bottom); and approximately ¼" thick.

The fins 16 are preferably made of a rubber or rubber-like material. The most preferred material is a food-grade siliconized rubber, such as a Viton® brand fluoroelastomer. Viton is a product of DuPont Dow Elastomers.

As may best be seen in this FIGS. 2 and 3, one side of each fin 16 includes a rectangular metal tab 18 that essentially bisects that fin 16. This tab 18 measures approximately 3" in length, ½" in width, and ½" in height. These metal tabs 18 are placed on opposite sides of adjacent fins 16.

In other words, as may be seen in FIG. 3, a first fin 16 has the metal tab 18 on a front side. The second or next adjacent fin 16 has the metal tab 18 on the back side. The third or next adjacent fin 16 has the metal tab on the front side, and so on.

The movement of the fins 16 is effectuated by forces that act upon those fins 16 during the process of manufacturing the gyros cones. As will be explained below, the fins 16 pivot to differing positions that result in different effective diameters for the end fitting 14. For example, the fins 16 can be configured in a way such that the end fitting 14 has a relatively small diameter (FIG. 2), or the fins 16 can be configured in a way such that the end fitting 14 has a relatively large diameter (FIG. 3).

Figure 6:
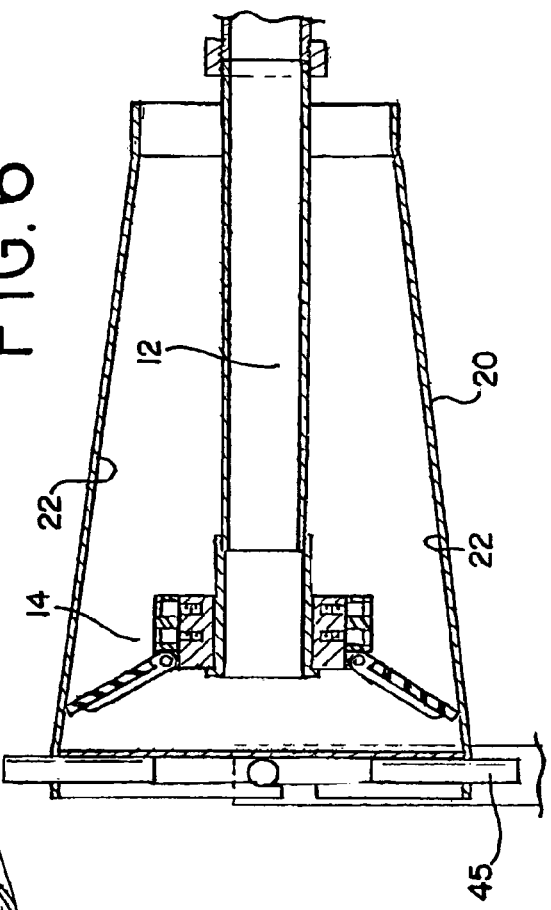
FIG. 6 is a partial sectional view of the widest portion of the mold casing, positioned adjacent the end fitting, in preparation for filling of the mold casing with meat.
Figure 5:
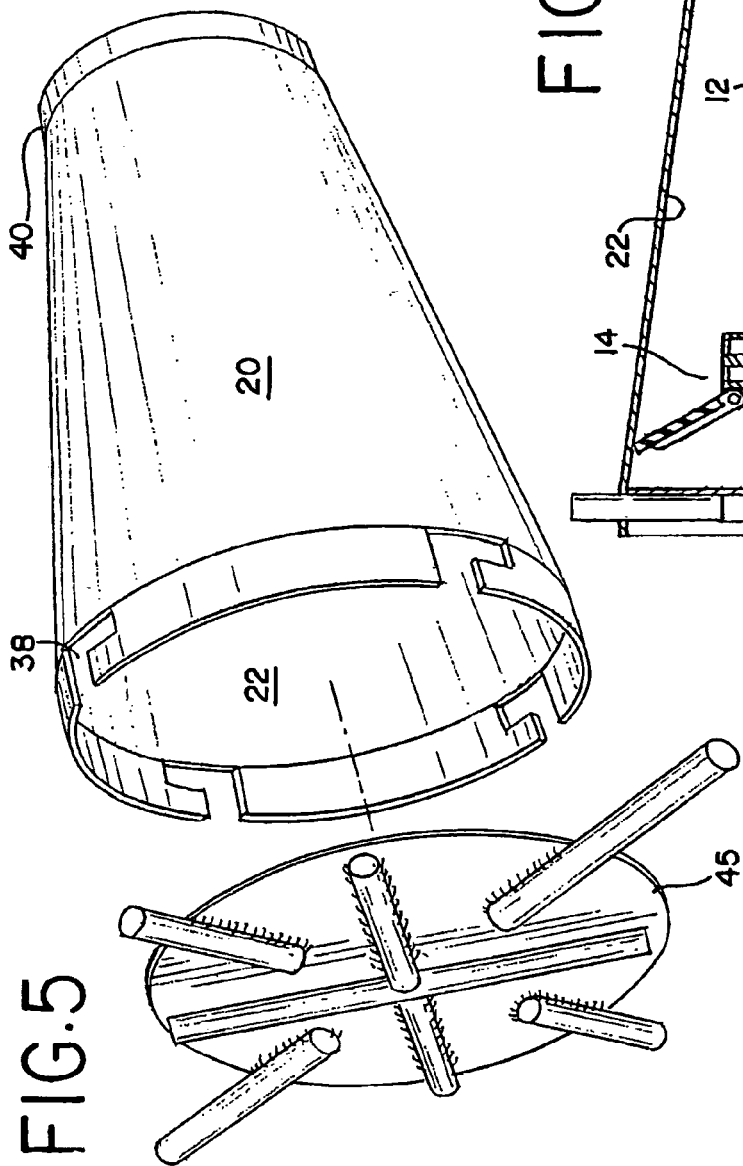
FIG. 5 is a perspective view of the mold casing used, together with the end fitting of the invention, to make cone-shaped gyros; and the end flange that may be removably secured to that mold casing.

Particularly, when the fins 16 are adjacent the widest end of a mold casing 20, the fins 16 expand, in the manner of a flower whose petals are opening, so that the effective diameter of the end fitting 14 increases, as may be seen in FIGS. 3 and 6.

In contrast, as the fins 16 are contacted by the inner walls adjacent the narrower ends of the moving mold casing 20, the fins 16 contract, so that the effective diameter of the end fitting 14 decreases, taking on a smaller diameter such as shown in FIGS. 2 and 8.

Referring again to FIGS. 2 and 3, the fins 16 are arranged in an overlapping relationship, regardless of the effective diameter of the end fitting 14. When the fins 16 are in the position shown in FIG. 3, they are somewhat spread apart from each other.

In contrast, when the fins 16 are in the position shown in FIG. 2, they are spaced more closely together.

Referring now again to FIGS. 2 and 3, and as briefly discussed above, the fins 16 include rectangular tabs 18. The tabs 18 have the effect of stiffening the fins 16, and especially the perimeters of those fins 16. In this way, the tabs 18 inhibit undesirable flexing of the perimeters of the fins 16. Such flexing at the perimeters of the fins 16 could compromise the seal that those fins 16 make with the inner walls 22 of the mold casing 20.

In summary, these fins 16 are pivotable, flexible, adjacent to each other, and at least partially overlapping. The end fitting 14 has a variable diameter. The variation in the diameter is effected by the pivoting of the fins 16, during the movement of the mold casing 20 relative to the stationary end fitting 14. In other words, it is the pivoting movement of the fins 16 that causes the variation in the effective diameter of the end fitting 14.

Referring now to FIG. 4, the end fitting 14 includes a head portion 24. The head portion 24 is generally cylindrical, and includes a plurality of channels 26. The channels 26 are preferably uniformly spaced about the circumference of the head portion 24.

Each of the channels 26 receives a block 28, and this block 28 is preferably machined. Each machined block 28 is identical. As a result, each machined block 28 can be interchangeably placed into any of the channels 26.

Each machined block 28 is slidably inserted into the channel 26, and has a tight, friction fit within the channel 26. However, to ensure that the machined block 28 stays within its channel 26 during the gyros manufacturing process, at least one screw 30 is inserted through a first orifice 32 in that machined block 28, and then through a threaded second orifice 34 that is formed in the head portion 24.

A hinge 36 is formed about end of each machined block 28 and one end of each fin 16. Each fin 16 is pivotably secured about one those hinges 36.

As alluded to above, unlike the stationary meat stuffer 12, the mold casing 20 is movable. Particularly, during the process used to make the gyros cone, the mold casing 20 moves laterally upon a carriage, and generally along its own axis. The axis of the mold casing 20 is generally co-axial with the axis of the meat stuffer 12. Again, however, all that is necessary is that the mold casing 20 and the meat stuffer 12 (and its attached end fitting 14) be movable relative to each other. It is of no importance which of these elements moves or is stationary.

The mold casing 20 and a removable end flange 45 for that mold casing 20 are shown in FIGS. 1-5 and 8. The carriage along which the mold casing 20 moves is hydraulically-actuated. Such hydraulically actuated carriages, their structure, and their use in the manufacturing of conventional cylindrical bulk gyros are all well known in the art.

Prior to the commencement of the meat filling operation, this removable end flange 45 is connected to the wider end of the mold casing 20. This removable end flange 45 forms the bottom of the mold casing 20, during the meat filling operation.

To prevent the meat from sticking to the inner walls 22 of the mold casing 20 during filling, a plastic bag (not shown) may be inserted into the mold casing 20, and adjacent those inner walls 22. The inner surfaces of that bag may be sprayed with a non-stick coating. Alternatively, the plastic bag may be eliminated, and the manufacturer may directly spray the non-stick coating onto the inner walls 22 of the cone-shape mold casing 20.

The next sequence of Figures, i.e., FIGS. 6-8, shows the process of manufacturing the initially cone-shaped gyros. In FIG. 6, the widest diameter portion of the mold casing 20 has been positioned adjacent the discharge end of the stuffer 12. As the ground meat 10 is discharged from the discharge end of the stuffer 12, the bottom of the mold casing 20 begins to fill. The fins 16 maintain at least a partial seal with the inner wall 22 of the mold casing 20. As a result, pressure builds within that mold casing 20. As that pressure builds, the mold casing 20 begins to move laterally upon the carriage, and away from the end of the stationary meat stuffer 12.

Referring now to FIG. 7, the meat 10 has filled approximately half of the mold casing 20. The mold casing 20 has been moved by the carriage to a position where the end fitting 14 and its fins 16 are disposed adjacent the middle of that mold casing 20. The fins 16 pivot during the movement of the mold casing 20 from their position as shown in FIG. 6 to their position as shown in FIG. 7. As a result of the pivoting of these fins 16, those fins 16 are able to maintain their sealing contact with the inner wall 22 of the mold casing 20.

Figure 9:
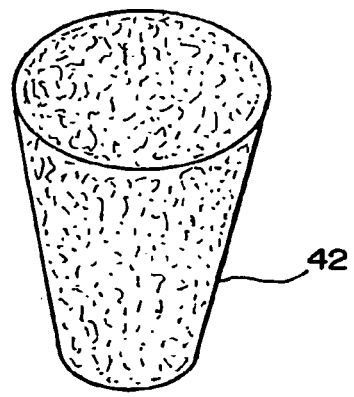
FIG. 9 is a perspective view of the finished gyros cone of the invention.

Referring now to FIG. 8, in this Figure the meat 10 has completely filled the mold casing or cone 20. The mold casing 20 has been moved along the carriage to a position where its narrowest end is adjacent the end fitting 14. The fins 16 pivot still further during the movement of the mold casing 20 from the intermediate position of FIG. 7 to the narrow end position of FIG. 8. Those fins 16 continue to maintain their sealing contact with the inner wall 22, at the narrowest end of the mold casing 20. After the cone 20 has been completely filled, the end flange 45 may be removed from the cone-shaped container, and the finished product 42, as may be seen in FIG. 9, may be removed from that mold casing 20.

The end fitting 14 is at a maximum effective diameter in FIG. 6. In FIG. 7, the end fitting 14 is depicted at an intermediate effective diameter. Finally, in FIG. 8, the end fitting 14 is shown at a minimum effective diameter.

From the above description and the drawings, it should be apparent that the effective diameter of the end fitting 14 increases and decreases as the fins 16 pivot about the hinge 36. During movement of the fins 16 towards and away from the widest end of that mold casing 20, the adjacent fins 16 open and close, respectively, in the manner of the opening and closing of the petals of a flower.

From the above description and drawings, it should also be apparent that each of the fins 16 remains in at least partial contact with the adjacent fin 16, as the mold casing 20 is moved from one of its lateral ends 38 to its other lateral end 40, relative to the stationary end fitting 14.

It should also be apparent that the fins 16 slide along and sealingly engage the mold casing 20 The fins 16 constantly pivot to conform, as closely as possible, to the changing cross-sections defined by the inner wall 22 of the mold casing 20.

The specific embodiments have been illustrated and described. Numerous modifications are possible, without significantly departing from the spirit of the invention. Accordingly, the scope of protection is only limited by the scope of the accompanying claims.

What is claimed is:

1. A process of making a free-standing, substantially cone-shaped meat product from a ground meat raw material, comprising:
    (a) providing a meat stuffer with an end fitting, the end fitting having a plurality of pivotable fins;
    (b) inserting said end fitting so that said fitting is adjacent to one lateral end of a cone-shaped mold casing; and
    (c) filling said mold casing with the ground meat product, wherein the effective diameter of the end fitting changes, as that mold casing is moved along that end fitting.

2. The process of claim 1, wherein the fins are at least partially overlapping.

3. A device for manufacturing a frusto-conical shaped meat product using a mold casing that receives ground meat under pressure, comprising:
    (a) a mold casing having an inner wall, a first lateral end, and a second lateral end, the mold casing being of a frusto-conical shape, for forming the meat product into a desired shape and cross section; and
    (b) an end fitting secured to the discharge end of a meat stuffer, the end fitting comprising a plurality of pivotable, at least partially overlapping fins,
    wherein the fins pivot within the mold casing, to maintain at least partial contact with the inner wall of the mold casing.

4. The device of claim 3, wherein the mold casing is laterally movable along a first axis, the first axis being generally coaxial with a second axis through the center of the meat stuffer.

5. The device of claim 3, wherein each fin remains in contact with an adjacent fin as the mold casing is moved along the end fitting.

6. The device of claim 3, wherein each fin at least partially overlaps the adjacent fin.

7. The device of claim 3, wherein the fins slide along and sealingly engage the mold casing as the mold casing is moved laterally along the end fitting, and wherein the fins conform to the changing cross-sections of the inner wall of the mold casing.

8. A device for manufacturing a frusto-conical shaped meat product, comprising
    (a) an end fitting; and
    (b) a plurality of partially overlapping fins secured to, and pivotable about, that end fitting.

9. The device of claim 8, wherein said end fitting is removably secured to the discharge end of a meat stuffer.

* * * * *